United States Patent [19]

Murata

[11] 4,126,885
[45] Nov. 21, 1978

[54] CARD RECORDING AND/OR REPRODUCING APPARATUS

[75] Inventor: Yukishige Murata, Funabashi, Japan
[73] Assignee: Sony Corporation, Tokyo, Japan
[21] Appl. No.: 704,089
[22] Filed: Jul. 9, 1976
[51] Int. Cl.² ............................................. G11B 25/04
[52] U.S. Cl. ........................................... 360/2; 360/88
[58] Field of Search ................. 360/2, 88, 118; 362/2, 362/105

[56] References Cited
U.S. PATENT DOCUMENTS

| | | | |
|---|---|---|---|
| 3,678,212 | 7/1972 | Wild | 360/2 |
| 3,800,327 | 3/1974 | Okita | 360/105 |
| 3,810,241 | 5/1974 | Murata | 360/105 |
| 3,959,822 | 5/1976 | Platt | 360/105 |
| 3,997,917 | 12/1976 | Kihara | 360/2 |
| 4,040,108 | 8/1977 | Nakata | 360/2 |

Primary Examiner—Jay P. Lucas
Attorney, Agent, or Firm—Hill, Gross, Simpson, Van Santen, Steadman, Chiara & Simpson

[57] ABSTRACT

A magnetic card recorder which is capable of recording and replaying a signal on a magnetic track on the card and which has an actuator including at least two card engaging portions for engaging and detecting the card as it travels through the machine in which the two detecting means are spaced on opposite sides of an erase head which is mounted so as to float relative to the card, and, thus, to prevent transverse fluctuations between the erase head and the card.

8 Claims, 10 Drawing Figures

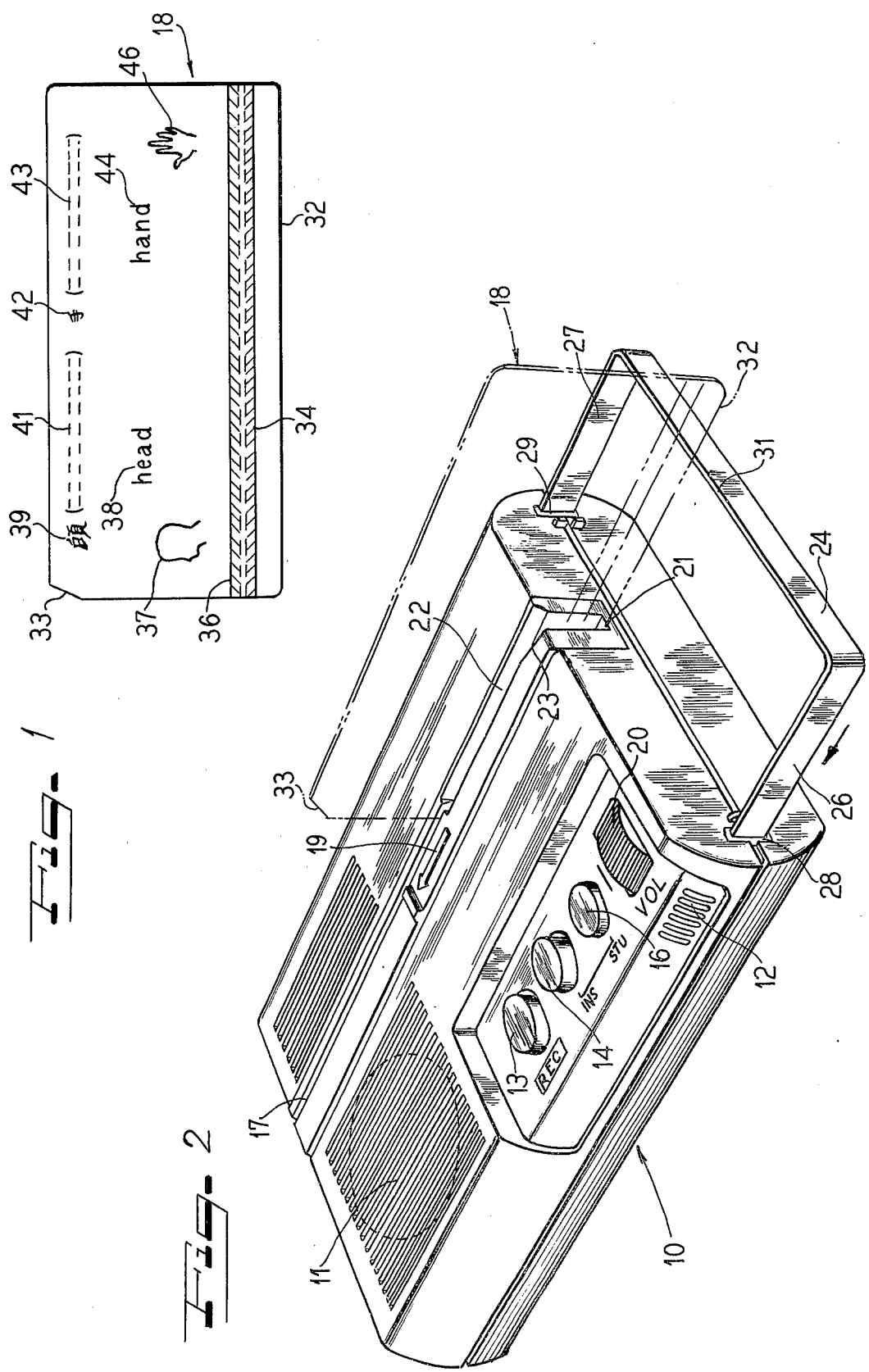

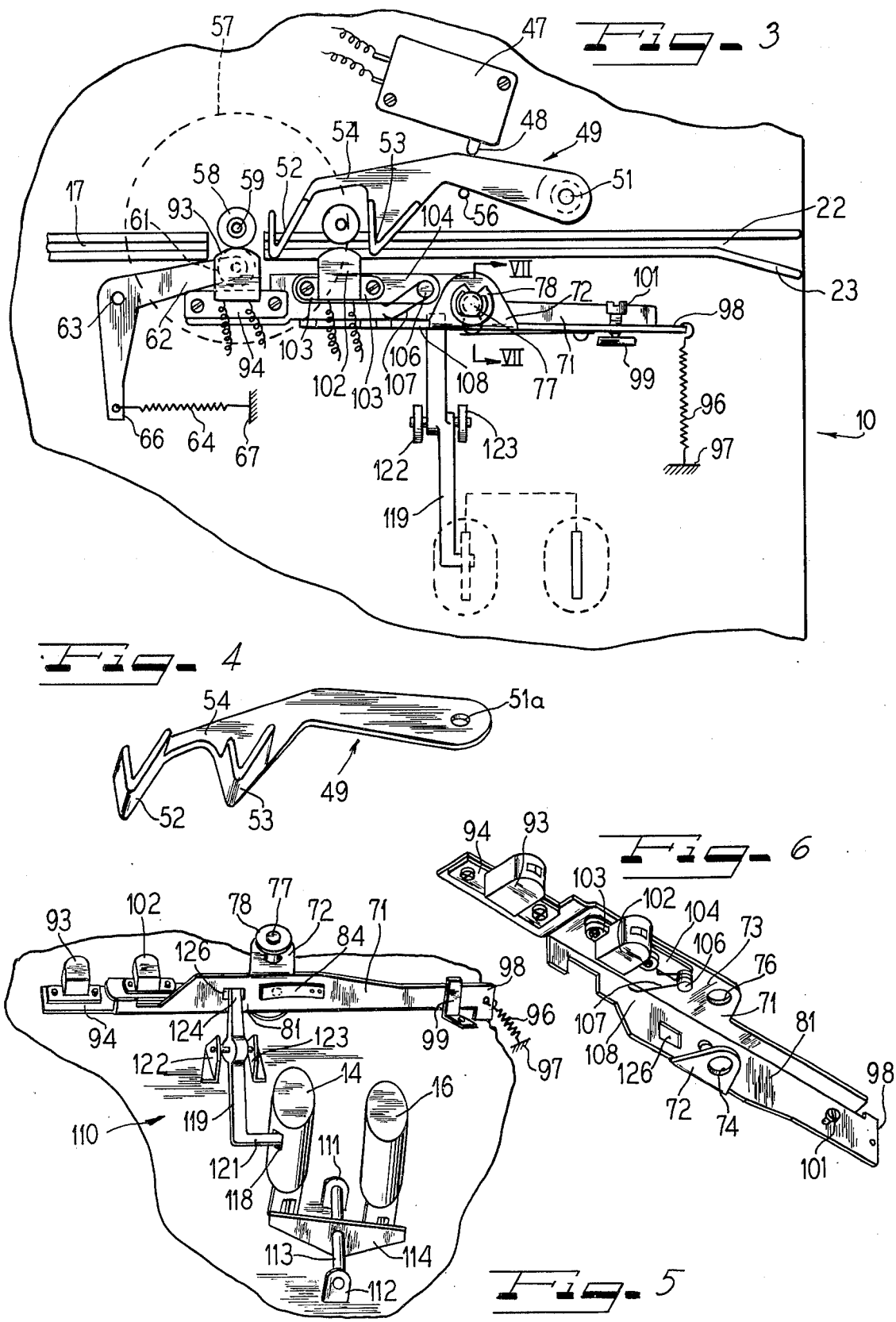

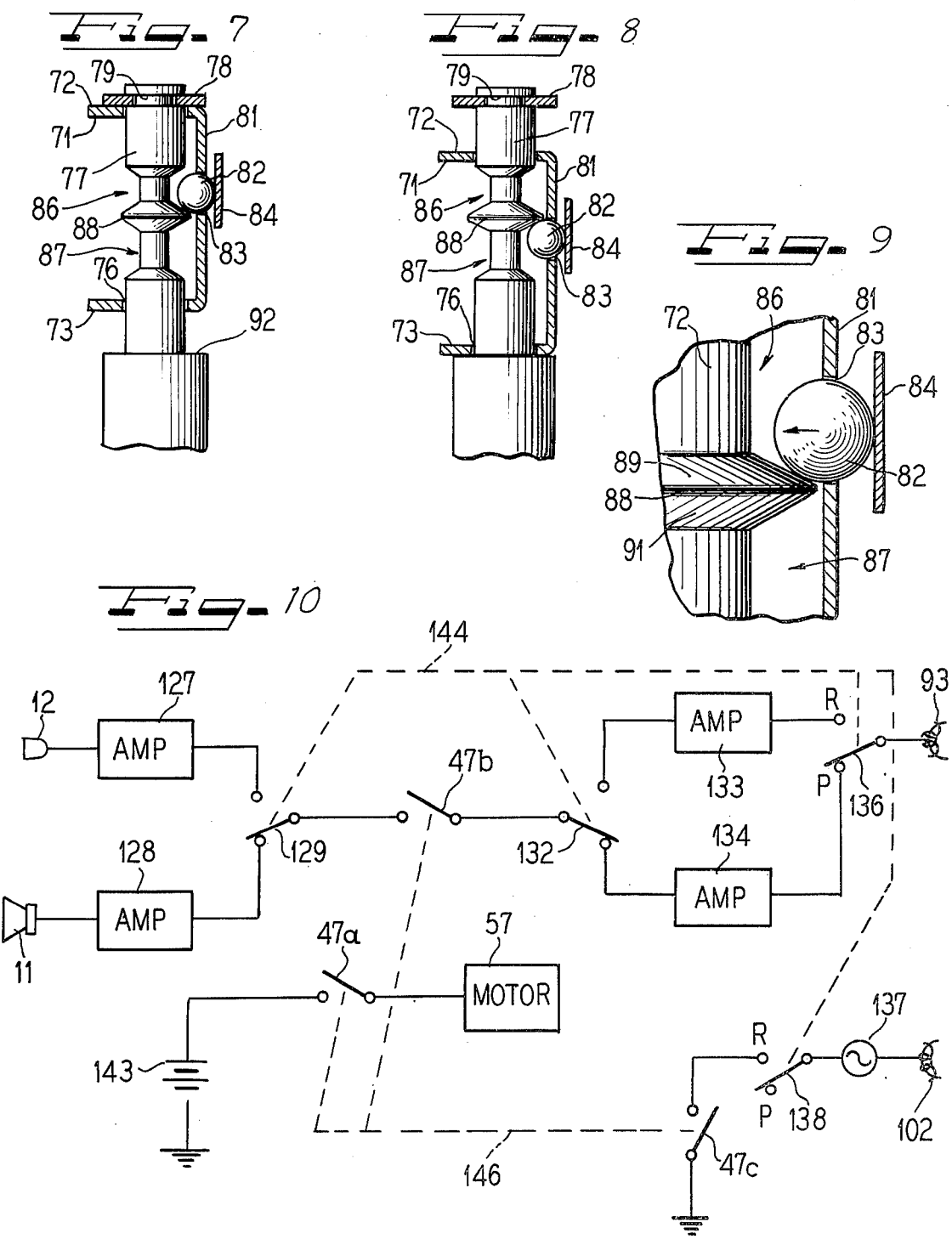

CARD RECORDING AND/OR REPRODUCING APPARATUS

BACKGROUND OF THE INVENTION

1. Field of the Invention

The present invention relates to a magnetic card recorder/playback machine for transporting and converting audio signals to and from magnetically stripped cards and particular to control features of such device.

2. Description of the Prior Art

Magnetic card recording and/or reproducing apparatus which utilize a card upon which magnetic tracks are mounted are useful for educational and teaching purposes as, for example, studying foreign languages. Machines of the prior art have not been capable of utilizing the entire magnetic track on the card and have also been improperly erased due to transverse motion of the erase head relative to the card due to vibrations caused by movement of the card and varying thicknesses of the card. Furthermore, prior art devices had very expensive vertical head positioning and referencing means and have required that the card be held and guided by hand so that it does not tilt relative to the machine.

SUMMARY OF THE INVENTION

A so-called card recording and/or reproducing apparatus in which the card carries magnetic tracks as, for example, for a teacher and a student and with sounds corresponding to pictures or letters printed on the card for use in educational and other training as, for example, studying foreign languages. Such machines are very useful for story telling for children, for example. It is an object of the present invention to utilize the full length of the track during recording and/or reproduction because the full length of the track is limited to the length of the card which might be about 19 cm and the full length of the track would give 4 to 8 seconds of audio signal.

With prior art machines, portions of the magnetic track on the card cannot be erased or recorded completely because the erasing head follows the record head and, generally, on the last portion of the card the prior signal will remain and be reproduced with the new signal.

It is an object of the invention to provide erasing of the full magnetic track on the card.

It is another object of the present invention to provide a stand or rest or a handle which has a reference surface against which the card may be placed so as to properly align the card as it is inserted into the card machine. Wherein a handle is used, the handle can be used for carrying the machine as well as for providing a reference plane for inserting the card in the machine. The handle or stand should be positioned so that it is slightly less than about L/2 where L is the length of the card so as to prevent the card from tilting.

Another feature of the invention is to provide means for positioning the magnetic heads relative to two tracks on the card very accurately and precisely with apparatus which is much less expensive than that used by prior art devices. In the present invention, a lower horizontal reference plane establishes the lower position of the magnetic heads and an upper horizontal reference plane determines the upper reference position of the magnetic heads and a spring biasedball and a pair of inclined surfaces bias and hold the magnetic heads against the upper or lower reference planes selectively to provide an inexpensive detent positioning mechanism.

Yet another feature of the invention is to provide a floating head support mechanism for the erasing head which is mounted on a sub-chassis mounted on the main head chassis and wherein the erasing head is spring biased against the card. The advantage of a floating erasing head is that it prevents the erasing head from being effected by the card driving mechanism including the pinch roller and capstan which could cause the erase head to bounce and move transversely of the card due to varying thicknesses in the card. As a practical matter, the card and magnetic tracks have no uniform thickness due to the adhesives used to attach the tape to the card and, thus, during driving of the card the main head chassis will fluctuate and move transversely of the card and where the erasing head is carried on the main head chassis the erasing head contact with the track will fluctuate. This causes the erasing to be imcomplete and the floating sub-chassis for the erase head comprises a substantial improvement in such machines so that the contact between the erasing head and the track will not be affected by variations of the main chassis.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a plan view of a card;

FIG. 2 is a perspective view of the card playing machine of the invention;

FIG. 3 is a partially cut-away view of the invention showing the double pawl actuator and the floating head support for the erase head;

FIG. 4 is a perspective view of the double pawl actuator;

FIG. 5 illustrates the control mechanism for vertical movement of the head deck;

FIG. 6 is a perspective detail view illustrating the head deck with the erase head floating deck;

FIG. 7 illustrates the head positioning mechanism with the head deck in the up position;

FIG. 8 illustrates the head deck positioning mechanism with the head deck in the lower position;

FIG. 9 is an enlarged detail view illustrating the ball detent of the head positioning mechanism, and FIG. 10 is an electrical schematic of the invention.

DESCRIPTION OF THE PREFERRED EMBODIMENTS

FIG. 1 illustrates the magnetic playback and recording machine for a card having magnetic tracks thereon which has a microphone 12 and a loudspeaker 11. The machine has a record button 13, an instructor playback button 14, a student playback button 16 and a volume control 20. A card receiving slot 17 extends across the top of the machine in the direction indicated by arrow 19 and is adapted for receiving a card 18 shown in FIG. 1 with its bottom edge 32 resting agnast the bottom of the slot. The upper front portions 22 of the slot 17 are provided with upper tapered surfaces and the outer end toward the right of FIG. 2 of the slot is enlarged by the tapered portion 23 so as to easily receive the card therein. A handle 24 has a center portion and side portions 26 and 27 which are slidably received in slots 28 and 29 of the machine 10 and has an upper surface on the center portion 24 which lies in a plane with the bottom of the slot 17 such that when the card 18 is inserted into the portion 23 of the slot 17 the edge 31 of the handle 24 holds the card 18 level with the bottom of the slot 17. The handle 24 when in its extended position provides that the center portion 24 is a distance of L/2 or less where L is the length of the card so that the card will not tilt relative to the bottom of the slot 17. Although the handle 24 is illustrated as the supporting means for the card it is to be realized, of course, that a stand or other suitable support means can be used. When the machine is not being utilized, the handle 24 can be depressed into the confines of the machine 10 for storage.

As illustrated in FIG. 1, the card carries a pair of magnetic tracks 34 and 36 which extend the length of the card and the front upper corner 33 may be slanted so as to provide a reference for indexing the card. The magnetic track 36 might be the instructor track and the track 34 might be for the student. A character 39 which might be a foreign word, for example, and a sentence using such word might be printed in the area 41 of the card. A picture 37 of the word is printed on the card and the work is printed in another language in position 38 on the card. A second character 42 with a sentence 43, a picture 46 and the word printed in a different language at position 44 may also appear on the card 18.

In use, the user places the front end of the card in the tapered portions 23 and 22 of the slot 17 with the bottom of the card 32 resting on the portion 31 of the handle 24 and it engages mechanism within the machine to be described hereafter for drawing the card through the machine for recording or reproducing the signal on the magnetic tracks 34 and 36.

FIG. 3 is a top plan view of the machine 10 with the top cover removed and illustrates the slot 17 and the double pawl actuator 49 which is pivotally supported on a shaft 51 and which has a pair of pawls 53 and 52 which are engageable by a card 18 as it passes through the slot 17 and wherein the pawl portions 52 and 53 are separated by a portion 54. A motor 57 drives a capstan 58 mounted on the output shaft 59 of the motor. A pinch roller 61 is located under the main magnetic head 93. The pinch roller 61 presses the card 18 against the capstan 58 and the roller 61 is carried by a pivot arm 62 mounted on a shaft 63. The pivot arm 62 has one end 66 connected to a spring 64 which has its opposite end connected to the chassis 67 of the machine so as to spring bias the pinch roller 61 against the card and capstan 58. The double pawl actuator 49 is engageable with a stop 56 mounted on the chassis 67 of the machine and is engageable with a spring mounted actuating switch contact 48 of a micro-switch 47 for energizing the drive motor 57 and other portions of the machine.

FIGS. 3, 5 and 6 illustrate the main head chassis 71 and the main magnetic head 93 is connected to a bracket 94 which is attached to one end of the main chassis 71 as shown. An erasing head 102 is mounted on a bracket 103 which is attached to a sub-chassis 104 which is pivotally connected to portion 73 of the main head chassis 71 by a pivot shaft 106 and a spring 107 has one end that engages a vertical portion 108 of the main chassis and another end which engages the subchassis 104 to bias the magnetic head 102 toward the magnetic tracks on the card 18.

Vertical openings 74 and 76 are formed through horizontal portions 72 and 73 of the main head chassis 71 and a guide shaft 77 is mounted on the chassis 67 of the machine and rotatably supports the main head chassis 71.

A stop 99 is mounted on the machine chassis 67 and a screw 101 is threadedly received in the head chassis 71 and is adjustable so as to allow adjustment of the main chassis 71 relative to the stop 99. A spring 96 has one end connected to the end 98 of the main chassis 71 and the other end connected to an anchor 97 on the chassis 67 of the machine so as to spring bias the main magnetic head 93 toward the card 18.

As is best shown in FIGS. 5, 6, 7, 8 and 9, the main head chassis 71 is also mounted so it can be placed in two vertical positions so as to align the heads 93 and 102 with the tracks 34 and 36 on the card 18.

A pair of vertical brackets 111 and 112 rotatably support a member 114 on the shaft 113 and the student button 16 is mounted so as to move the right side of member 114 downwardly relative to FIG. 5 and the instructor button 14 is mounted so as to move the left side of the member 14 downwardly relative to FIG. 5. A second pair of brackets 122 and 123 rotatably support a linkage 119 which has an end 121 engageable in an opening 118 of the instructor button 14 and its opposite end 124 is receivable in an opening 126 of the main head chassis 71. Thus, by depressing either the instructor button 14 or the student button 16, will cause the main head chassis 71 to move to either a top or bottom reference position to align the head 93 and 102 with the magnetic tracks 36 and 34. By depressing the instructor button 14, the heads will align with the upper track 36 on the card 18 and by depressing the student button 16 the heads 93 and 102 will align with the student track 34.

The main chassis 71 has horizontal reference members 72 and 73 as shown in FIGS. 7 and 8 separated by a vertical portion 81. The shaft 77 is formed with grooves 86 and 87 separated by a portion 88 which has oppositely tapered surfaces 89 and 91 as illustrated in FIG. 9. A ball 82 is received in an opening 83 in the portion 81 and a leaf spring 84 attached to the portion 81 engages the ball 82 to bias it inwardly toward the shaft 77. A lower horizontal reference surface 92 is formed on the shaft 77 such that when the lower horizontal portion 73 of the main head chassis 71 engages the surface 92 with the ball 82 pressing against the tapered surface 91 after it has passed over the high point 88 will place the heads 93 and 102 precisely aligned with the lower magnetic track 34 on the card 18.

The shaft 77 is also provided with a groove 79 adjacent its upper end so as to receive an E or C spring washer 78 therein. The lower surface of the washer 78 establishes a reference position for the upper horizontal portion 72 of the main chassis 71 with the ball 82 engaging the tapered surface 89 such that the heads 93 and 102 are aligned with the track 36 on the card 18.

It is to be realized that the horizontal surface 92 and the lower surface of the washer 78 accurately and precisely define the lower and upper positions, respectively, for the main chassis 71 and, thus, the position of the heads 93 and 102 and the ball and tapered surfaces 89 and 91 merely provide spring bias so as to hold the main chassis 71 in the upper or lower positions. This is significant because the tolerance for machining the surfaces 89 and 91 is not critical because the ball 82 can rest anwhere along the tapered surfaces 89 and 91 and will take a position so as to cause the surfaces 72 and 73 to respectively engage the washer 78 or the surface 92. The result is that the tolerance for the tapered surfaces 89 and 91 need not be maintained very close and such surfaces merely provide the spring bias for the main chassis.

FIG. 10 is an electrical schematic and illustrates the microphone 12 connected to an amplifier 127 and to a terminal engageable by a switch 129 when in the record mode. Switch 129 is connected to a terminal of a switch 47b which is connected to the movable member of switch 132 that can be connected to amplifiers 133 or 134. The output of amplifier 133 is connected to a record contact engageable with a switch 136 which is connected to the main magnetic head 93. The amplifier 134 is connected to a playback contact of switch 136. The motor 57 is connected through switch 47a to a battery 143 which has its other side connected to ground. The erase head 102 is connected to an AC source 137 which has its other side connected through switch 138 to an open terminal in playback mode and to a terminal R in the record mode which is connected to a terminal of switch 47c which has its movable contact connected to ground.

The double pawls 52 and 53 are engaged by the card as, for example, when the card is inserted into the machine the front edge of the card engages pawl 53 which closes contacts 47a, 47b and 47c so as to apply power from the battery 143 to the motor 57 and, thus, cause the capstan 58 to be driven. If the switches 129, 132, 136 and 138 are in the playback mode they will be in the positions illustrated in FIG. 10 and the magnetic head 93 will detect the magnetic track and pass the signal through amplifier 134 switches 132, 47b, 129 and amplifier 128 to the speaker 11. After the rear end of the card 18 has passed the pawl portion 53 the switch 47 will remain closed because the pawl portion 52 engages the card 18 and, thus, the motor 57 will remain energized to drive the card until it is beyond the pawl portion 52 after which the actuator 49 can move counterclockwise relative to FIG. 3, thus, allowing switch 47 to open to stop the motor 57. The double pawl portions 52 and 53 are arranged so that they fall on opposite sides of the recording head 102 and, thus, all of the magnetic tracks 34 and 36 can be erased with the present machine. It is also desirable that the main head 93 be placed closely adjacent the pawl portion 52 which assures that at least all of the front portion of the magnetic tracks 36 and 34 receive a recorded message and also only a very small or short portion at the end of the tracks receives no recorded signal from magnetic head 93. When the pawl portions 52 and 53 are mounted on opposite sides of the erase head, the only portion which is not recorded on the end of the card would be the distance from the pawl 52 to the main head 93 and this can be made very short.

Alternatively, the pawl portions 52 and 53 can be positioned so that both the main head 93 and the erase head 102 fall between them and for this condition all of the magnetic tracks are erased and recording can occur on the entire magnetic track.

In either of these conditions, distance between the pawl portion 52 and the main head 93 can be made very short so substantially all of the magnetic tracks 34 and 36 can be completely erased and completely recorded.

During record mode, the linkage 144 moves switches 129, 132, 136 and 138 upwardly relative to FIG. 10 such that the microphone 12 supplies a signal through amplifier 127, switch 129, switch 47b, switch 132, amplifier 133 and switch 136 to the main head 93 for recording thereon. The erase head 102 receives a signal from AC generator 137 because the switch 138 is grounded through switch 47c to energize the AC source 137.

Although the invention has been described with a single actuator 49 having two spaced pawl portions 52 and 53 which engage the card and wherein when the switch 47 is closed by the pawl 53 the machine is actuated and furthermore when the card passes pawl 53 but is still in engagement with pawl 52 the switch remains closed until the card has passed pawl 52. The switch remains closed even though the card no longer engages pawl 53. When pawl 52 no longer engages the card then the switch 47 will open and the motor 57 will turn off. It is to be realized, of course, that the actuator 49 with two pawls 52 and 53 which actuate a single switch could be replaced by a pair of switches and two independent actuators such that the switches are connected in parallel and if either of the switches is closed the circuit will be energized to drive motor 57.

It is to be realized that the double pawl actuator 49 or the alternative two switch and two actuator embodiment provide time delay functions corresponding to the movement and position of the card and, thus, allow greater portions of the magnetic tracks 36 and 34 to be utilized than in the prior art which utilizes only one actuator or one switch and wherein such structure provides no time delay function.

It is seen that the present invention provides an improved magnetic card reproducing or recording machine and although it has been described with respect to preferred embodiments it is not to be so limited as changes and modifications may be made therein which are within the full intended scope as defined by the appended claims.

I claim as my invention:

1. A magnetic recording and/or reproducing apparatus with card guide path for a card having a pair of elongated magnetic parallel tracks comprising, means for driving said card, a machine chassis, a main head chassis, a recording head mounted on said main head chassis which is pivotably attached on said machine chassis and biased by spring toward said card in order to be in operative relationship with said magnetic tracks on said card, an erase head movably mounted relative to said recording head on said main head chassis so as to maintain a predetermined relationship to said magnetic track as said card moves through apparatus, wherein said main chassis is mounted for vertical movement between upper and lower positions wherein said magnetic head is aligned with one or the other of said magnetic tracks, upper and lower horizontal stoppers engageable with said main chassis such that said upper horizontal stopper determines said upper position and said lower horizontal stopper determines said lower position, and over-the-center spring biasing means engageable with said main chassis with its center position between said upper and lower positions such that it biases said main chassis upwardly against said upper horizontal stopper when the main chassis is above said center position and biases said main chassis downwardly against said lower horizontal stopper when said main chassis is below said center positions.

2. A magnetic apparatus according to claim 1 wherein said erase head is mounted on said main chassis by means including a subchassis moveably mounted on said main chassis, spring biased toward said magnetic track and said erase head mounted on said sub-chassis.

3. A magnetic apparatus according to claim 2 wherein said sub-chassis is pivotally mounted on said main chassis.

4. Apparatus according to claim 1 wherein said main chassis is formed with a vertical opening, a vertical positioning member mounted to the machine and passing through said opening in said main chassis and said upper and lower horizontal stoppers formed on said positioning member and establishing horizontal planes engageable with upper and lower edges of said main chassis.

5. Apparatus according to claim 4 wherein said positioning member has a pair of oppositely tapered surfaces and said main chassis is formed with a ball receiving opening, a ball received in said opening and engageable with said tapered surfaces, and a spring biasing said ball toward said tapered surfaces.

6. A magnetic apparatus according to claim 1 further including stop means to stop a movement of said main head chassis toward said magnetic track.

7. A magnetic apparatus according to claim 6 wherein said stop means includes an adjustable screw.

8. A magnetic apparatus according to claim 1 further including change-over means to shift up and down said main head chassis.

* * * * *